(12) United States Patent
Warsinger et al.

(10) Patent No.: US 11,465,098 B2
(45) Date of Patent: Oct. 11, 2022

(54) BATCH PRESSURE-DRIVEN MEMBRANE SEPARATION WITH CLOSED-FLOW LOOP AND RESERVOIR

(71) Applicant: Massachusetts Institute of Technology, Cambridge, MA (US)

(72) Inventors: David Elan Martin Warsinger, Potomac, MD (US); John H. Lienhard, Lexington, MA (US); Emily Winona Tow, Cambridge, MA (US); Ronan Killian McGovern, Cambridge, MA (US); Gregory Parker Thiel, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 73 days.

(21) Appl. No.: 16/199,690

(22) Filed: Nov. 26, 2018

(65) Prior Publication Data

US 2019/0160431 A1 May 30, 2019

Related U.S. Application Data

(62) Division of application No. 15/350,064, filed on Nov. 13, 2016, now Pat. No. 10,166,510.

(Continued)

(51) Int. Cl.
*B01D 61/08* (2006.01)
*B01D 61/02* (2006.01)
(Continued)

(52) U.S. Cl.
CPC ............ *B01D 61/08* (2013.01); *B01D 61/02* (2013.01); *B01D 61/025* (2013.01);
(Continued)

(58) Field of Classification Search
CPC ............ B01D 2311/14; B01D 2311/25; B01D 2313/24; B01D 2313/50; B01D 2315/10;
(Continued)

(56) References Cited

U.S. PATENT DOCUMENTS

| 3,831,757 A | * | 8/1974 | Gossett | ................... C02F 9/005 210/143 |
| 4,243,523 A | | 1/1981 | Pelmulder | |

(Continued)

OTHER PUBLICATIONS

Richard L. Stover, "Industrial and brackish water treatment with closed circuit reverse osmosis," 51 Desalination and Water Treatment 1124-1130 (2013).

(Continued)

*Primary Examiner* — Dirk R Bass
(74) *Attorney, Agent, or Firm* — Modern Times Legal; Robert J. Sayre

(57) ABSTRACT

A feed of at least one of (a) a source liquid including a solvent with a dissolved impurity and (b) a retentate of the source liquid is pumped in a substantially closed loop through a liquid-separation module. The liquid-separation module includes a membrane that passes at least partially purified solvent to a permeate side of the membrane while diverting the impurity in a retentate on the retentate side of the membrane. The purified solvent is extracted from the permeate side of the membrane; and the retentate from the liquid-separation module is pumped to or through a pressurized reservoir with a variable volume for the feed component and recirculated as a component of the feed. Over time, the volume for the feed is reduced and the pressure applied to the feed in the reservoir is increased to balance against an increasing difference in osmotic pressure across the membrane.

8 Claims, 3 Drawing Sheets

Related U.S. Application Data

(60) Provisional application No. 62/298,009, filed on Feb. 22, 2016.

(51) Int. Cl.
*C02F 1/44* (2006.01)
*B01D 61/10* (2006.01)
*C02F 103/08* (2006.01)

(52) U.S. Cl.
CPC ........... *B01D 61/027* (2013.01); *B01D 61/10* (2013.01); *C02F 1/441* (2013.01); *C02F 1/442* (2013.01); *B01D 2311/14* (2013.01); *B01D 2311/25* (2013.01); *B01D 2313/24* (2013.01); *B01D 2313/50* (2013.01); *B01D 2315/10* (2013.01); *B01D 2315/14* (2013.01); *C02F 2103/08* (2013.01); *C02F 2209/03* (2013.01)

(58) Field of Classification Search
CPC .. B01D 2315/14; B01D 61/02; B01D 61/025; B01D 61/027; B01D 61/08; B01D 61/10; C02F 1/441; C02F 1/442; C02F 2103/08; C02F 2209/03
See application file for complete search history.

(56) References Cited

U.S. PATENT DOCUMENTS

| | | |
|---|---|---|
| 4,482,456 A | 11/1984 | Grayson |
| 4,814,086 A | 3/1989 | Bratt |
| 4,983,301 A | 1/1991 | Szucz et al. |
| 5,232,591 A | 8/1993 | Solomon |
| 5,358,635 A | 10/1994 | Frank et al. |
| 7,892,429 B2 | 2/2011 | Oklejas, Jr. |
| 8,147,692 B2 | 4/2012 | Oklejas, Jr. |
| 8,808,538 B2 | 8/2014 | Oklejas, Jr. |
| 2001/0017278 A1 | 8/2001 | Verde |
| 2003/0205526 A1 | 11/2003 | Vuong |
| 2009/0173691 A1 | 7/2009 | Oklejas, Jr. |
| 2011/0198275 A1 | 8/2011 | Hayes |
| 2014/0197086 A1 | 7/2014 | Vuong et al. |

OTHER PUBLICATIONS

M. Barello, et al., "Operation and Modeling of RO Desalination Process in Batch Mode," Proceedings of the 24th European Symposium on Computer Aided Process Engineering (2014).

R. Stover, "Evaluation of closed circuit reverse osmosis for water reuse," in Proc. 27th Annual Water Reuse Symp., Hollywood, FL, USA, September, Water Reuse Association, Paper B4-2 (2012).

USPTO, International Search Report and Written Opinion for PCT/US2017/018069 (dated Apr. 27, 2017) (related PCT application).

D. Warsinger, et al., "Energy efficiency of batch and semi-batch (CCRO) reverse osmosis desalination," 106 Water Research 272-282 (Sep. 25, 2016).

* cited by examiner

BATCH PRESSURE-DRIVEN MEMBRANE SEPARATION WITH CLOSED-FLOW LOOP AND RESERVOIR

RELATED APPLICATION

This application is a divisional of U.S. application Ser. No. 15/350,064, filed 13 Nov. 2016. This application also claims the benefit of U.S. Provisional Application No. 62/298,009, filed 22 Feb. 2016. The entire content of each of these applications is incorporated herein by reference.

BACKGROUND

The demand for removing salt from brackish and saline waters continues to increase, as water demand outstrips net rainfall for half the world's population, causing more reliance on groundwater withdrawal, seawater, agricultural water recovery, and potable water reuse. The fastest-growing technology used to meet these demands is reverse osmosis (RO), which is the most efficient technology for most water sources. Increasing RO energy efficiency is vital to reducing the operating cost and carbon intensity of desalination. While many research areas, such as membrane development, have reached diminishing returns in RO efficiency, there are still significant gains to be made in process design. Herein, we examine the efficiency improvements made possible by switching to time-variant RO systems and other systems for liquid mixture/solution separation.

Reverse-Osmosis (RO) Desalination:

While RO is the most energy-efficient desalination process under most conditions, further improvements on efficiency are advantageous for minimizing the $CO_2$ impact of the energy requirements for RO, allowing for RO where power production is limited, reducing energy costs, and improving public acceptance of desalination.

Batch reverse osmosis technologies are configurations that vary their salinity over time by recycling brine. Batch technologies have also shown impressively robust resistance to membrane fouling, although an explanation for this is lacking from the literature. One of the most rapidly growing technologies is a semi-batch RO process, called CCRO, or closed circuit reverse osmosis (and trademarked as CCD, or closed circuit desalination).

Closed Circuit Reverse Osmosis (CCRO):

Closed circuit reverse osmosis is a semi-batch process in which feed is continuously added to the system over time. In a CCRO system, feed water is pumped through the membrane module, where pure water passes through the membrane while the remaining solution is concentrated. The brine is then mixed with fresh, high pressure feed water and returned to the membrane module to be further concentrated. To account for this increasing concentration, the pressure of the system is increased over time. Once the desired amount of permeate has been produced, a valve is opened, and the system is refilled with feed in preparation for a new cycle. Several designs have been proposed historically in the patent literature for CCRO (U.S. Pat. Nos. 4,243,523, 4,814,086, and 4,983,301).

CCRO has potential advantages in terms of both fouling resistance and energy consumption. CCRO has been shown to be fouling resistant and has been tested to recoveries as high as 97%, although 88-92% is more typical. CCRO needs less energy than continuous RO because CCRO varies the pressure over time, which lets it stay closer to the osmotic pressure of the feed. In comparison, continuous RO sets the pressure everywhere above the maximum osmotic pressure of the outlet brine. However, one pitfall of CCRO is that it continuously mixes brine with incoming feed, which generates entropy and limits the efficiency of the process.

Past models of CCRO have modeled the process as a series of steady cycles with step pressure increases in between. This is a tolerable approximation for high recoveries (large numbers of cycles) with the cycles generally capturing the performance variation in time. However, these models do not capture the salinity profiles within the module. Furthermore, the discrete nature of the cycles prevents these from models from being used to study batch RO systems, which reach high recovery in few cycles. In order to improve accuracy and make a fair comparison to the batch process, we model CCRO as a temporally- and spatially-varying process that is modeled by numerically solving finely discretized equations, rather than a simple analytical model of a few cycles.

Other Batch Configurations:

With respect to RO, the term "batch" has been used to indicate several configurations. Herein, "batch RO" signifies that RO brine is recirculated through the RO membrane module without incorporating any fresh feed. On the other hand, the term "closed circuit RO" is used to refer to configurations where RO brine is mixed with feed and re-circulated in a continuous manner, which is termed a "semi-batch" process due to the continuous feed addition. While the idea of a completely batch RO was proposed in U.S. Pat. No. 4,983,301, the concept was further developed more recently by various inventors. Oklejas proposed systems where the brine recirculation was integrated within the RO pressure vessel (U.S. Pat. No. 8,808,538). Batch RO systems have been reported to have problems maintaining permeate quality [R. L. Stover, "Industrial and brackish water treatment with closed circuit reverse osmosis," 51 *Desalination and Water Treatment* 1124-1130 (2013)], so systems with variable feed pressure have also been proposed (see U.S. Pat. No. 7,892,429).

While others have explored batch RO processes, published studies on the modeling and performance of batch RO systems are limited. Barello conducted experiments on a batch RO process to study the influence of pressure and feed salinity on the water permeability constant of the membrane [M. Barello, D. Manca, R. Patel, and I. Mujtaba, "Operation and modeling of ro desalination process in batch mode," *Computers & Chemical Engineering*, 2015]. Tarquin and Delgado reported that batch RO may be specially resistant to fouling and scaling based on experiments in which fouling was not observed even with brackish water under high concentrations of silica and calcium sulfates at 90% recovery [A. Tarquin and G. Delgado, "Concentrate enhanced recovery reverse osmosis: a new process for RO concentrate and brackish water treatment," *Proc. American Institute of Chemical Engineers Meet.*, Pittsburgh, Pa., USA, October, American Institute of Chemical Engineers, Paper 272277 (2012)].

Membrane fouling can lead to declining flux, increasing stream-wise pressure drop, and changes in salt permeation. These changes, in turn, affect water cost through pretreatment requirements, increased energy consumption, frequent membrane cleanings, and eventually membrane replacement. Resistance to fouling of various types, including inorganic, organic, and biological, is thus a common theme in desalination research.

Inorganic fouling, or scaling, is of particular importance in low salinity water desalination. Khan, et al., in "How different is the composition of the fouling layer of wastewater reuse and seawater desalination RO membranes?," 59

*Water Research* 271-282 (2014), harvested foulant layers from RO membranes used to treat seawater and secondary wastewater effluent in a pilot plant, and found that, although organic foulants dominated in seawater RO and on the first membrane of wastewater RO, inorganic foulants comprised 88.9% by mass of the foulant layer on the last membrane in the wastewater RO train. The high degree of brine concentration due to the high recovery typical of low-salinity water desalination tends to concentrate inorganic foulants, such as calcium carbonate, to beyond their saturation limits, causing scale on the later membranes.

The susceptibility of RO membranes to damage by fouling has prompted the development of other processes, such as membrane distillation and forward osmosis, which are thought to exhibit greater resistance to fouling. However, the higher efficiency of RO makes it worthwhile to consider modifications to the RO process that could lead to improvements in fouling resistance. Stover has proposed that CCRO can reduce fouling and scaling through the time-variation of water composition at the membrane [R. Stover, "Evaluation of closed circuit reverse osmosis for water reuse," in *Proc. 27th Annual Water Reuse Symp.*, Hollywood, Fla., USA, September, Water Reuse Association, Paper B4-2 (2012)]. Herein, we examine the cycle time of CCRO as well as batch operation to identify potential gains in scaling resistance through these time-variant RO processes.

SUMMARY

Methods and apparatus for batch pressure-driven membrane separation are described herein, where various embodiments of the apparatus and methods may include some or all of the elements, features and steps described below.

A feed of at least one of (a) a source liquid including a solvent with a dissolved impurity and (b) a retentate of the source liquid (i.e., that which is retained without passing through a membrane) is pumped in a substantially closed loop through a liquid-separation module. The liquid-separation module includes a membrane that passes at least partially purified solvent (permeate) as filtrate to a permeate (downstream) side of the membrane while diverting at least a portion of the impurity in a retentate on the retentate (upstream) side of the membrane. The purified solvent is extracted from the permeate side of the membrane; and the retentate (as a feed component) from the liquid-separation module is pumped to or through a pressurized reservoir with a variable volume for the feed component (e.g., via changing the reservoir volume or via filling some of the space in the volume with another fluid) and recirculated as a component of the feed. Over time, the volume for the feed is reduced in the pressurized reservoir, in the conduits, and in the liquid-separation module; and the pressure applied to the feed in the reservoir is increased to balance against an increasing difference in osmotic pressure across the membrane as the feed increases in osmotic pressure. After a plurality of iterations through the above steps, a concentrated impurity stream is discharged from the liquid-separation module and new source liquid is supplied to the substantially closed loop.

The liquid-separation module can be, e.g., a reverse-osmosis module or a nanofiltration module (e.g., using a membrane with 1-10-nm sized through-pores) that removes divalent salts, or other kind of liquid-separation module; and the source liquid can be water with dissolved salts; however, in the examples using aqueous compositions described herein, water is just an example; and liquid solutions with a solvent other than water can be substituted therefor. The feed can flow continuously and simultaneously through the above-recited steps.

In various embodiments, the membrane in the liquid-separation module can be any structure that preferentially passes solvent to some degree while rejecting (blocking the passage of) solute to some degree. The membrane can be, e.g., an ultrafiltration (UF) membrane or a microfiltration (MF) membrane, or it can be from another class of membranes that is not specifically used for reverse osmosis or nanofiltration. In various embodiments, the membrane can be a polysolfonamide (UPM) membrane, a membrane formed with aquaporins, a graphene membrane (formed of graphene, graphene-oxide or reduced-graphene oxide), a mixed-matrix composite membrane (such as LG Chem's NanoH2O RO membranes), a carbon nanotube membrane, or a non-polymer membrane (such as a ceramic membrane). As used herein, "membranes" also include structures that behave in substantially the same way as traditional membranes but which may not have previously been recognized as being "membranes".

A batch, or time-varying, process, as described herein, can be very useful in the concentration of solutions with pressurized systems. Such systems include reverse osmosis desalination, which can remove salts or other solutes, and nanofiltration, which can remove specific contaminants including many divalent salts.

In particular embodiments, the system includes a batch loop including a reservoir fluidly connected to a high-pressure pump and/or the pressurizing side of a pressure exchanging device. The pump and/or pressurizing side of a pressurizing device is fluidly connected to the retentate side of a membrane housing, and the retentate side of the membrane housing is fluidly connected to the de-pressurizing side of the pressure exchanging device. The de-pressurizing side of the pressure exchanging device is connected to the reservoir. In other embodiments, a feed liquid holding tank may be fluidly coupled to the aforementioned reservoir to periodically fill the reservoir for each new batch.

Advantageously, whereas typical seawater reverse osmosis systems may have six, seven, or eight membranes in series within a pressure vessel, in batch systems—to facilitate lower recovery per cycle—one can utilize only one, two, three or four 4-inch membrane modules in series within the pressure vessel. In certain embodiments, this configuration may be achieved by using a pressure vessel that is roughly 40, 80, 120 or 160 inches in length, or by feeding the feed liquid to the center of a pressure vessel and splitting the flow (known as center-porting).

The feed can be continuously cycled around the loop; but, in one given cycle, the recovery rate of the liquid-separation module can be no more than 40%, 30%, or 20% or 10%.

The methods and apparatus described herein can provide energy savings, particularly in comparison to closed circuit reverse osmosis. Compared to a multi-stage continuous flow RO system, this configuration can significantly reduce design complexity and reduce capital costs, particularly at smaller scales. An added benefit of these configurations over continuous and semi-batch processes is that the feed pump, the efficiency of which is often from 65% to 91%, can be eliminated.

Applications for these methods and apparatus include treatment of seawater (desalination), brackish water, industrial wastewater (fracking water, textile water, etc.), food and beverage waters, and solutions for producing desired concentrates, such as concentration for crystallization.

A primary challenge to any batch design is that the system is inherently variable-volume. This means either having a methodology for changing volume while at high pressure or restoring systems to ambient pressure, which has significant energetic losses (but is the method implemented in industry).

The methods and apparatus disclosed herein offer various means of achieving simpler and more energy-efficient batch reverse processes. A significant difference between these inventions and semi-batch processes (in prior art), whereby fresh mixture is continuously added to a recirculated stream on the concentrate side of the filter, is the significant reduction in mixing of streams of different concentrations.

The RO batch processes described herein can be used to prevent nucleation of salt crystals and biofouling. Many applications require higher recovery for RO, as this reduces costs by minimizing pretreatment of unused feed and water waste. Furthermore, a trend in environmental legislation mandates for zero-liquid-discharge (ZLD) to reduce pollution from brine waste is requiring many applications to use higher recoveries. These trends also render advantageous the batch RO apparatus and methods described herein, which can achieve higher recovery than is achievable with continuous processes. Notably, batch processes and apparatus may be scaled to smaller sizes than current systems, as the batch apparatus can achieve high recovery with a single membrane module.

Figure 1:
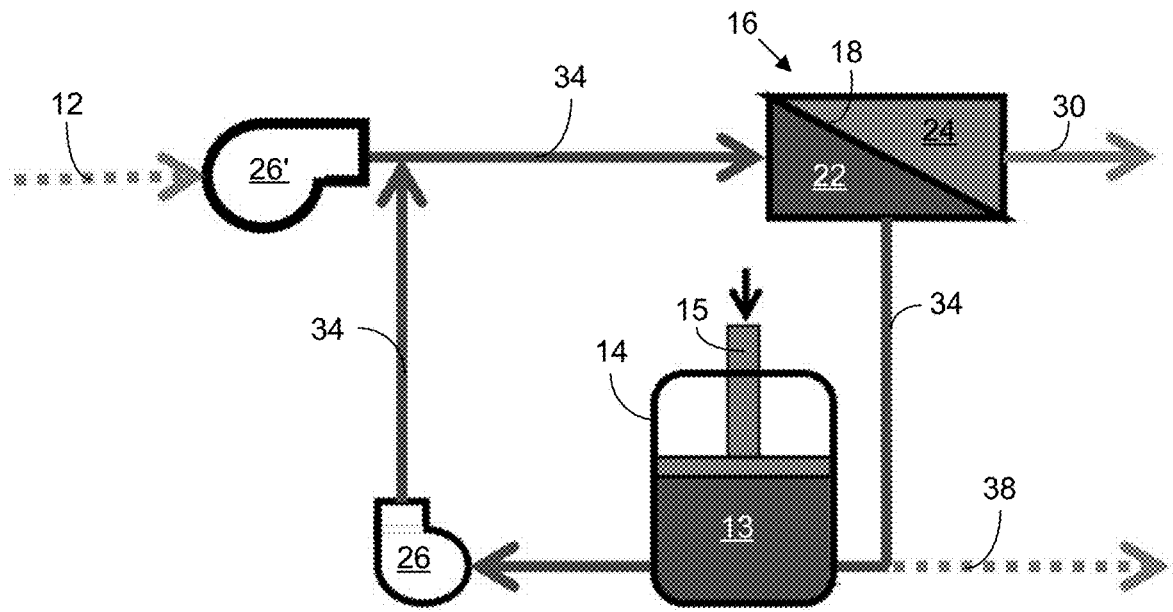
FIGS. 1 and 2 are schematic illustrations of variable-volume reservoir systems, wherein a piston 15 is employed in a reservoir 14 for the feed 13 to increase pressure and reduce the volume of liquid within the recirculated loop as the process proceeds.

In the accompanying drawings, like reference characters refer to the same or similar parts throughout the different views; and apostrophes are used to differentiate multiple instances of the same or similar items sharing the same reference numeral. The drawings are not necessarily to scale; instead, an emphasis is placed upon illustrating particular principles in the exemplifications discussed below. For any drawings that include text (words, reference characters, and/or numbers), alternative versions of the drawings without the text are to be understood as being part of this disclosure; and formal replacement drawings without such text may be substituted therefor.

DETAILED DESCRIPTION

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise herein defined, used or characterized, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially (though not perfectly) pure, as practical and imperfect realities may apply; e.g., the potential presence of at least trace impurities (e.g., at less than 1 or 2%) can be understood as being within the scope of the description. Likewise, if a particular shape is referenced, the shape is intended to include imperfect variations from ideal shapes, e.g., due to manufacturing tolerances. Percentages or concentrations expressed herein can be in terms of weight or volume. Processes, procedures and phenomena described below can occur at ambient pressure (e.g., about 50-120 kPa—for example, about 90-110 kPa) and temperature (e.g., −20 to 50° C.—for example, about 10-35° C.) unless otherwise specified.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments.

Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly.

Further still, in this disclosure, when an element is referred to as being "on," "connected to," "coupled to," "in contact with," etc., another element, it may be directly on, connected to, coupled to, or in contact with the other element or intervening elements may be present unless otherwise specified.

The terminology used herein is for the purpose of describing particular embodiments and is not intended to be limiting of exemplary embodiments. As used herein, singular forms, such as "a" and "an," are intended to include the plural forms as well, unless the context indicates otherwise. Additionally, the terms, "includes," "including," "comprises" and "comprising," specify the presence of the stated elements or steps but do not preclude the presence or addition of one or more other elements or steps.

Additionally, the various components identified herein can be provided in an assembled and finished form; or some or all of the components can be packaged together and marketed as a kit with instructions (e.g., in written, video or audio form) for assembly and/or modification by a customer to produce a finished product.

As noted, above, the apparatus and methods described herein can be used in any of a variety of liquid-separation systems, though for purposes of exemplification, various aspects of the invention will be discussed in the context of an RO system.

System 1: Variable-Volume Reservoir

Figure 2:
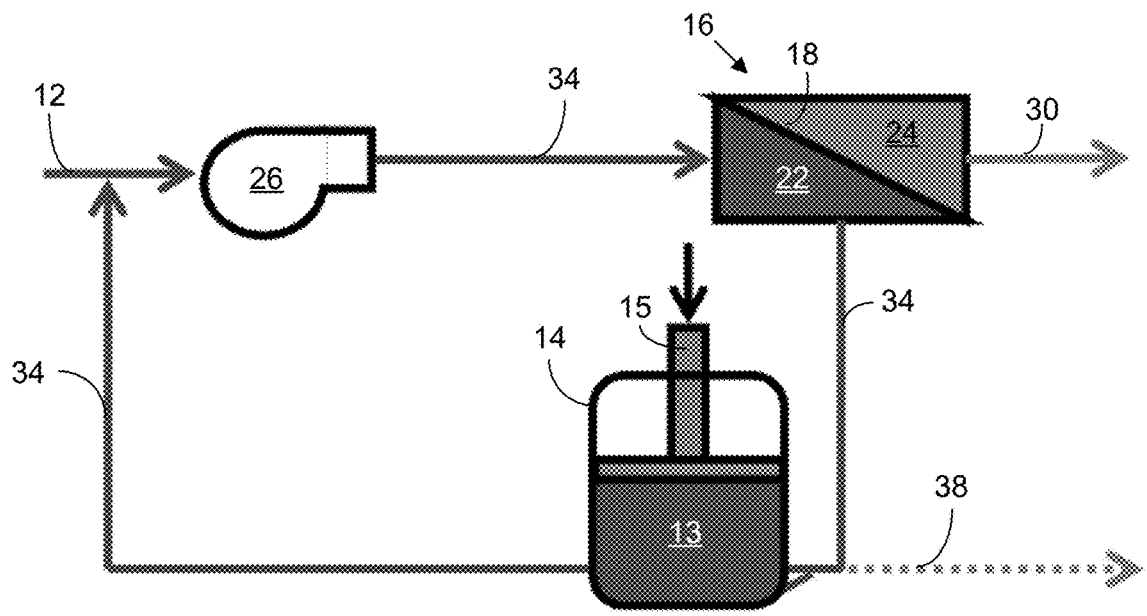
Figure 3:
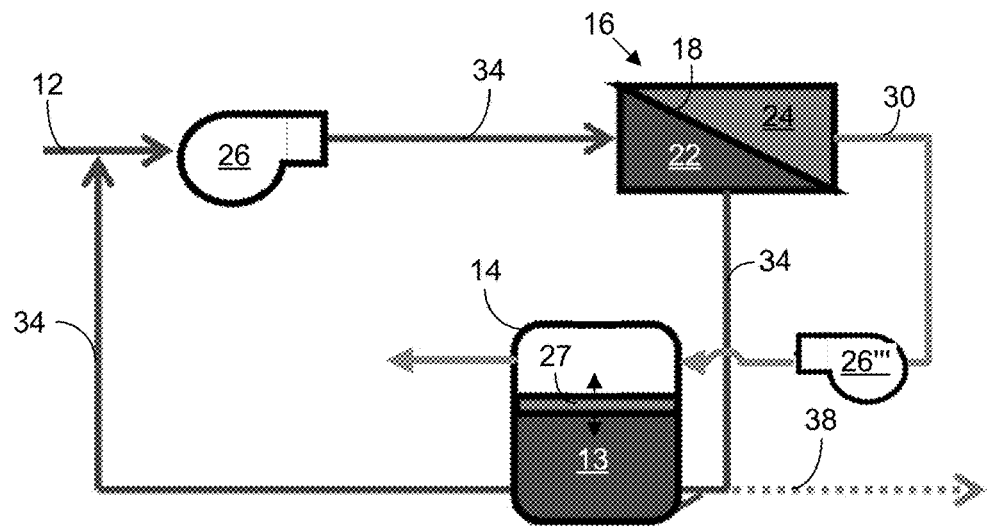
FIG. 3 is a schematic illustration of a variable-volume reservoir system, wherein the permeate 24 is pumped through one side of the reservoir 14 to apply pressure to the feed 13 on the opposite side of the reservoir 14.

In a variable-volume reservoir system (embodiments of which are shown in FIGS. 1 and 2), a piston 15 is employed to reduce the volume of liquid feed 13 within the conduit loop for recirculation of the feed 13 as the process proceeds. The recirculation loop is maintained at elevated pressure throughout the batch process. In the embodiment of FIG. 3, the permeate 24 is pumped through (and fills) the space in the reservoir 14 on an opposite side of a movable wall 27 (or of a membrane, bladder or diaphragm) from the feed 13 to apply pressure to the feed liquid 13. The pressure on the top side of the reservoir 14 can be governed by a supplemental pump 26''' for the permeate 24 and/or a control valve. In each case, the pressure applied to the feed 13 in the reservoir 14 is increased over time as the salinity of the feed/retentate 14 increases to counteract the increasing difference in osmotic pressure across the membrane 18.

In particular embodiments, the reservoir 14 has solid walls and a well-sealed moving wall (or portion of a wall) 27. In one exemplification, this system resembles a piston. The moving wall 27 can be hydraulically or pneumatically actuated or can be connected to a device, such as a motor and/or a generator that stores energy for reuse (in particular embodiments, the energy can be converted to electricity and stored), for increasing the pressure in the reservoir 14. Utilizing a generator in this device may also save energy, as when the system is being charged/refilled at higher than ambient pressure, work is being done to expand the volume of the tank, which can be recovered. Instead of using a motor, the reservoir 14 can be pressurized by means of a mechanical device (actuator) that can do work or have work done upon it and then restore that work on the feed 13. For example, the mechanical device can be a spring that compresses as the reservoir 14 is filled. The high-pressure feed liquid 13 does work on the spring as the feed liquid 13 is pressurized, and the spring does work on the feed liquid 13 as the volume for the feed 13 in the reservoir 14 is decreased. Instead of storing this energy mechanically with springs, the energy can also be stored with weights, using PE=mgh to store energy. In one embodiment, a variable gear setup applies pressure from a spring or weighted system, where the gear ratio is changed in order to apply the desired pressure. In other embodiments, cams, gears, pulleys or other mechanisms for providing mechanically reversible forces can be used; these components can be used in combination with other components, such as weights, springs, etc.

In another embodiment, this variable volume high-pressure reservoir 14 has two parts: an external solid tank and an internal flexible tank. In one embodiment, the internal tank contains the feed 13. In other embodiment, the internal tank can contain a pressurizing fluid, while the feed 13 surrounds the tank. This internal tank may be composed of a flexible polymer, or also operated like a solid tank with a moving part (e.g., in one embodiment, a piston). Inside the external tank but outside the internal one is a fluid (e.g., air or water), that is also pressurized. The pressurization can be achieved with a pump (e.g., an air pump or water pump), and the system can contain pressure or energy recovery when the fluid exits.

Figure 4:
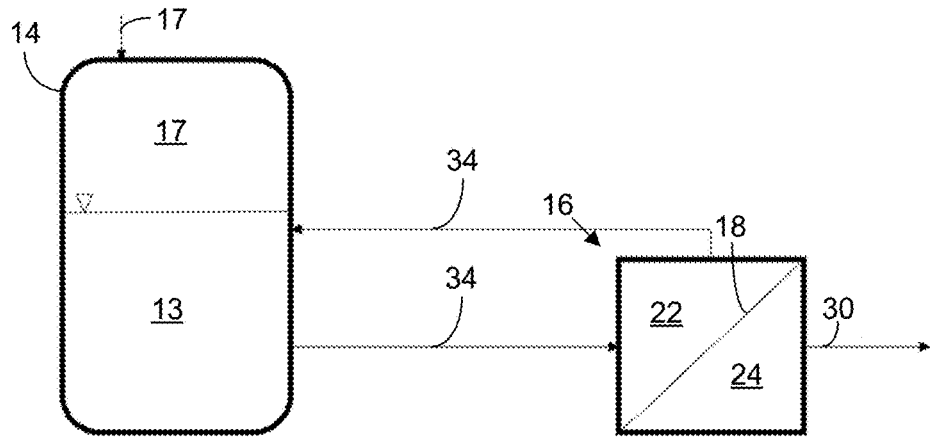
FIG. 4 is a schematic illustration of another embodiment of a pressurized reservoir system with a variable volume for the feed 13, wherein the reservoir 14 contains feed 13 and a pressurized gas or other fluid 17 filling the space above the feed 13 in the reservoir 14.
Figure 5:
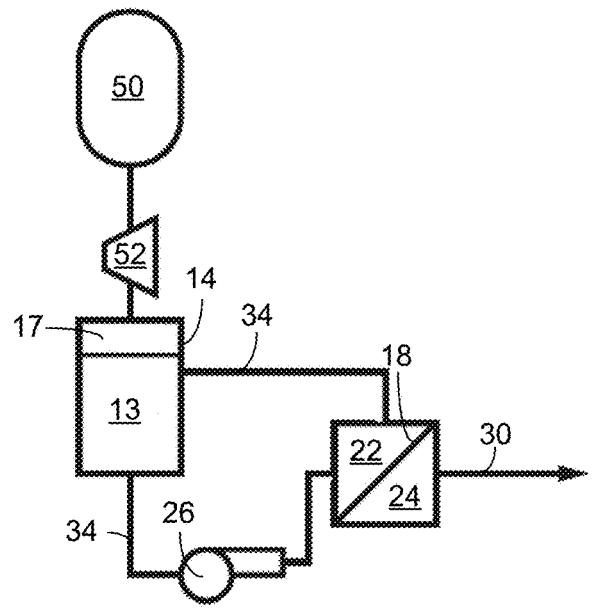
FIG. 5 is a schematic illustration of an embodiment of variable volume reservoir system with a high-pressure gas tank 50 and turbine or throttle 52 for controlling flow of the gas from the gas tank 50 to the reservoir 14.

In another embodiment (shown in FIG. 4), the high-pressure feed reservoir 14 contains feed liquid 13 and a pressurized gas or other fluid 17. As the batch process proceeds, fluid 17 is added to the reservoir 14, increasing the pressure of the feed 13 and the added fluid 17. The reservoir 14 is fluidly coupled to a pressurized fluid or gas tank 50 by a regulator or a turbine 52 in order to control the fluid/gas 17 entering the reservoir 14, as shown in FIG. 5. At the conclusion of a batch process, the fluid/gas 17 in the reservoir 14 can be recompressed and returned to the reservoir 14. A fluid 17 with a density about 10 times less than water can be effective in this regard; for example, the fluid 17 can be a form of liquid $CO_2$ or some other liquid gas, though it would generally not be advantageous to freeze the feed liquid 13, particularly if it's seawater.

System 2: Pressure Vessel Module

Figure 6:
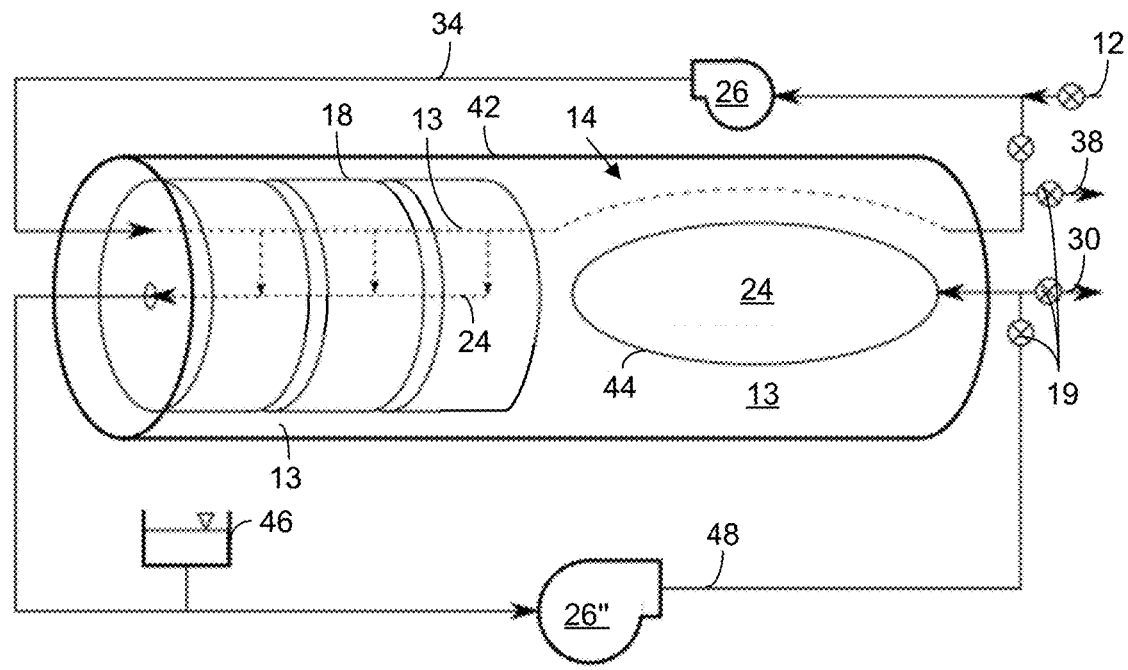
FIG. 6 is a schematic illustration of an embodiment of a pressure vessel 42 for the variable-volume reservoir system.

In particular embodiments (see FIG. 6), a pressure vessel 42 that contains a storage tank 44 with a variable volume for the feed and a pressurizing fluid (here, the permeate 24), wherein the variable-volume reservoir 14 for the feed/retentate 13 is defined around the variable-volume storage tank 44. The pressure vessel 42 also contains one or more membranes 18, which can be spiral wound to capture permeate 24 between windings and stacked in series, wherein the feed 13 circulates in alternating layers on opposite sides of the membrane 18 from the permeate 24. The permeate 24 and recirculating brine (retentate/feed) 13 are extracted from the vessel 42. The storage tank 44 inside the pressure vessel 42 acts to maintain the system volume; consequently, at most, a small makeup reservoir 46 that supplies the permeate/solvent liquid (e.g., water) 24 may be needed to account for changes in fluid density and pressure vessel volume due to elastic deformation. For example, the makeup reservoir 46 can supply additional solvent (e.g., water) 24 to account for the increasing density of the feed 13 and possible expansion of the pressure vessel 42 due to pressurization. Alternatively, a liquid other than the permeate can be used to fill the variable-volume chamber. The storage tank 44 can take the form of a flexible bladder (as shown in FIG. 6), a flexible tank, a piston-cylinder, or a piston that slides within the walls of the pressure vessel 34. A high-pressure permeate pump 26" sets the permeate flow rate and thus the pressure of the entire pressure vessel 42, except for the permeate channels, which are at atmospheric pressure. A circulation pump 26 circulates saltwater or other feed liquid 13 through the system to maintain a reasonable mass transfer coefficient. The state of the valves 19, which can likewise be used in the other embodiments described and illustrated herein, determines whether purified solvent (e.g., water) 24 is being produced or whether brine (concentrated feed 13) is being flushed out by new feed 13. Typically, this brine ejection occurs across open valves 19 at near-atmospheric pressure. In other embodiments, another fluid (other than or in addition to the permeate solvent 24) is pumped into and through the storage tank 44, as described above and below.

In the illustrated embodiment of FIG. 6, the membranes 18 are in a spiral-wound cylindrical configuration; and the feed is pumped (in either direction) by the circulation pump 26 through a conduit 34 between windings of the membranes 18, wherein the permeate (e.g., purified water) 24 passes through the membrane 18 to an interior volume from where it is extracted via a conduit 48 via the permeate pump 26" to the expandable permeate storage tank 44 (here, in the form of an inflatable bladder) inside the pressure vessel 42. Accordingly, the volume of the storage tank 44 can expand and contract (e.g., expanding over time during each batch process) inside the pressure vessel 42: as it expands, the storage tank 44 forces water (or other solvent) from the circulating brine 13 in conduit 34 through the membranes 18; during refilling between cycles, the storage tank 44 contracts as fresh feed is added to the pressure vessel. After sufficient concentration, the increasingly saline feed 13 can be removed from the system through a valve 19 via conduit 38. Similarly, permeate 24 can be removed from the permeate storage tank 44 through a valve 19 via conduit 30.

System 3: Batch System with Pressure Recovery

Figure 7:
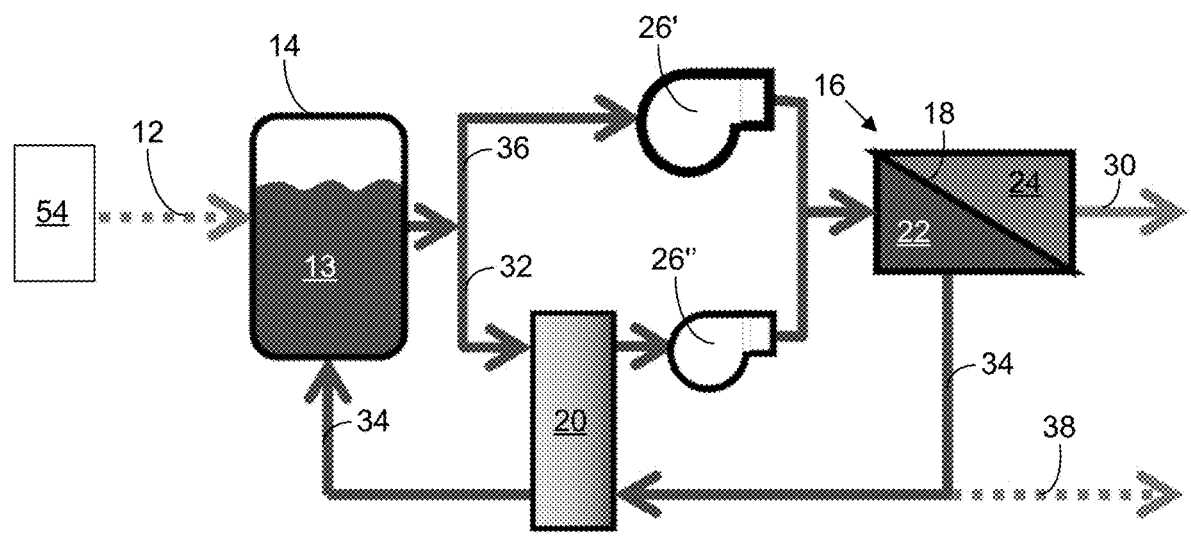
FIG. 7 is a schematic illustration of an embodiment of a batch system with pressure recovery via a pressure exchanger 20.

As described in U.S. application Ser. No. 15/296,688 (D. Warsinger, et al.), additional embodiments (as shown in FIG. 7) achieve an energy-efficient batch process by recovering energy from the recirculated high-pressure stream by means of a pressure recovery device or a similar device (e.g., a device that converts pressure into electrical energy for storage or transfer). This system can be designed in a flow loop, comprising the following components: a high-pressure pump for inlet source liquid, membrane module(s), an energy recovery device system after the modules, a tank for brine storage, and a connection back to the inlet of the module. The system can also have additional fluid pathways for intake and for rejection that are activated by electrically-actuated valves.

Several types of devices may be used for pressure recovery. These pressure recovery devices (pressure exchangers) include rotary pressure exchangers (such as those produced by Energy Recovery, Inc., of San Leandro, Calif., USA); pressure recovery pumps; systems with turbines for energy capture and storage/transfer; and piston systems, such as a piston double chamber with a hydraulically driven pump and reciprocating design [e.g., a dual work exchanger energy recovery (DWEER) device]. The system can use a pressure exchanger 20 only to exchange pressure between the retentate from an RO module and the feed entering that module (or a different module). The pressure exchanger 20 can be, e.g., an isobaric device, a turbocharger, or an integrated pump and positive displacement pressure exchanging device. Moreover, the pressure exchanger can be modified to optimize for widely variable pressures. This modification may include changes in the size of ducts, an overall increase in the size of the pressure exchanger 20, providing the ability to shut off certain holes for fluid passage through the pressure exchanger at different pressures, etc. A valve blocking off the pressure exchanger 20 can also be provided so that flow does not leak from feed 13 to permeate 24 once shutdown between batches occurs. This valve can be an actuated valve or a passive directional valve, such as a check valve. Components to alter the speed of rotation of the pressure exchanger 20 (for a rotary pressure exchanger) can also be provided. Given the frequency of shutdown, a motor (such as a variable-frequency-drive motor) can be added to periodically start the pressure exchanger rotation. Brakes can be added to the pressure exchanger 20, as well. To aid in startup of the pressure exchanger 20, some of the flow channels can be curved, instead of using straight-flow ducts, to enhance torsional forces as the solvent (e.g., water) 24 flows through; e.g., a corkscrew-shaped flow path that causes rotation of the solvent 24 can be used—as the solvent 24 rotates, it exerts torque on the pressure exchanger 20, causing it to rotate as well.

One exemplification of an energy-efficient batch process uses a reduced-pressure reservoir 14 in a circulation loop with the liquid-separation module 16, while recovering the energy from the circulating fluid during depressurization through energy recovery or pressure recovery. In particular embodiments, the pressure exchanger further acts as an energy-recovery system, wherein the high-pressure retentate has its pressure reduced through a pressure exchanger that operates as an energy recovery device, including, e.g., a turbine that converts the change in enthalpy into electrical work. Then, the feed is re-pressurized by converting that electrical work back into a pressure increase in the feed (e.g., by powering a pump) before the feed passes back through the membrane module. This system can be designed in a flow loop that comprises a high-pressure pump for inlet source liquid, one or more membrane modules, an energy recovery device after the modules, a tank for brine storage, and a connection back to the inlet of the module. The system can also have additional fluid pathways for intake and for rejection that are activated, e.g., by controllable valves (the valves in the system can be, e.g., manually, spring, electrically, pneumatically, or hydraulically actuated valves).

Alternatively, the system can use a pressure recovery device (or "pressure exchanger") instead of an energy recovery device. These devices transfer pressure from one stream to another and may be thought of as a "heat exchanger" for pressure. These devices tend to be much more efficient than energy-recovery devices. However, most have the following limitation: they need equal flow rates between the pressure-exchanging streams. Batch systems are constantly changing volume, and the only variable-volume component is the tank, the volume of which decreases over time. The stream being pressurized, therefore, always has a larger volume than the stream being depressurized, so a bypass stream with a high-pressure pump is utilized. The pressure exchanger is not 100% efficient, so a booster pump can be utilized after the pressure exchanger. This system can be designed in a flow loop comprising the following: a high-pressure pump for inlet source liquid, one or more RO membrane modules, a pressure exchanger for pressure recovery after the modules, high-pressure and booster pumps to support the pressure exchanger, a reservoir for feed storage, and a connection back to the inlet of the RO module. The system can also have additional fluid pathways for intake and for rejection, and flow through those pathways can be activated by electrically actuated valves.

Other types of pressure-recovery devices may alternatively be used, including pumps with integrated pressure recovery, e.g., utilizing a piston design. Centrifugal and circulation pumps may also be designed for use with a joined or separate pressure exchanger.

Entropy generation due to mixing of fresh aqueous source liquid 12 with recirculated retentate in CCRO systems can be minimized through a fully batch process. In each cycle of such a process, the feed of source liquid enters only at the beginning of a cycle. The retentate from the RO module is circulated and concentrated over time and then exits the system.

A batch process designed using only existing components, including reservoir 14 and a pressure exchanger 20, is shown in FIG. 7. A source-liquid (e.g., seawater) holding tank 54 is fluidly coupled with the pressurizable reservoir 14 via a conduit to the reservoir to supply source liquid as a component of the feed 13 in the reservoir 14 (the source-liquid holding tank can likewise be incorporated into the other configurations shown and illustrated herein. In additional embodiments, the reservoir 14 can be in the form of a permeate bladder inside a pressure vessel that also includes a reverse osmosis module 16 or that is otherwise pressurized, as described herein. The batch process cycles the applied pressure on the membranes in order to improve energy efficiency, as well as to optimize permeate flux and maintain antifouling characteristics.

At the beginning phase of the process, the reservoir 14 is filled (by opening an actuated valve in fluid communication with a liquid source) with new aqueous source liquid 12. The feed 13 from the reservoir 14 then proceeds to the pressurizing pumps 26 (and pressure exchangers 20) for pressurization. Some liquid passes through the main high-pressure pump 26' to maintain equal flow rates through the pressure exchanger 20. Typically, if a pressure exchanger 20 is used, a make-up pump 26" will finish pressurization until the pressure in the RO module 16 is reached. Next, the flow of the feed 13 proceeds through the RO module(s) 16. After exiting the RO module 16, the flow of the retentate 22 from the module 16 is directed back to the reservoir 14. The pressure in the RO module 16 increases over time as the salinity in the feed 13 increases. The most efficient methodology from the standpoint of the flow loop is to gradually increase pressure as salinity increases. The necessary pressure will be a function of the osmotic pressure, plus additional excess pressure to overcome viscous losses and improve permeate flux. In particular embodiments, a variable-frequency-drive (VFD) pump can be used to vary the pressure of the feed 13. As an end step, a valve is opened to release permeate 24 through conduit 30; and the pressure of pumping is reduced.

Optionally, an osmotic backwash of the membrane 18, can be performed by reducing the pressure of the feed 13 on the upstream side of the membrane 18 below the pressure on the permeate side of the membrane 18. Backwashing with osmotic pressure has proven extremely effective in eliminating fouling in RO systems. In such a process, the osmotic pressure on the saline (retentate) side exceeds that on the applied pressure, causing permeate to flow back from the permeate side to the retentate side of the membrane 18.

Osmotic backwashing can be seamlessly incorporated into batch and semi-batch systems with the following methodology for pressure control. This procedure is performed by one or more pressure setpoints (or ranges) on the pumps, specific valves, and backpressure and other pressure regulators. For example, a pressure sensor in the flow path can communicate (when a setpoint is triggered or when the pressure passes into or out of a limited range of pressures) with a controller that changes the pump flow rate and also opens/closes the valve(s) at certain points in the cycle. The principle behind osmotic backwashing is a reduction of the pressure of the saline stream sufficient so that it no longer counteracts the full osmotic pressure of that salinity, causing pure permeate to flow in the opposite direction through the membrane, backflushing as it flows towards the feed side from the permeate side.

In one embodiment of osmotic backwashing in batch systems, the batch system completes a cycle, where the salinity of the feed 13 is sufficiently high such that the reservoir 14 needs to be purged. The applied pressure of the feed/retentate loop is decreased by stopping pumping, typically combined with opening a release valve for outflow from this loop. This release valve (e.g., a butterfly valve) may be variable-volume to allow very little feed 13/retentate 22 to leave. One way to decrease the pressure is to open a valve in the high-pressure part of the loop, another is to decrease the pumping pressure setpoint of the pumps 26. The feed 13 is now at low pressure, causing permeate 24 to flow back through the membrane 18 from osmotic pressure. Note that the permeate valves are open such that permeate may flow back freely. As water is substantially incompressible, a flow path with variable volume is provided. This variable-volume flow path can be achieved via a piston system, bladder, or simply a tank/reservoir exposed to atmosphere that has a volume that can vary. An alternative to this approach is frequent backwashing, where periodically the pump pressure is decreased but then increased again to resume the cycle.

Component Details

For these systems to operate effectively, a few components are included in the system. For the opening of the system at the beginning and end of a cycle, electrically actuated valves can be used to change the flow of the liquids. For batch system, a valve can be used to expose the flow to the inlet feed for the charging step. After sufficient feed is added to the system, this valve closes. For semi-batch systems, this entry valve can allow for variable-volume flow or can be omitted entirely.

An exit valve can also be used at the end of the batch and semi-batch processes. This valve opens a flow path to empty the brine from the system.

Any of these valves can be replaced by multiple valves to achieve the same purpose. These valves may be a ball valve, gate valve, plug valve, spool valve, diaphragm valve, or other types. Where flow control is desired, a Globe valve, needle valve, or butterfly valve may be used.

In describing embodiments of the invention, specific terminology is used for the sake of clarity. For the purpose of description, specific terms are intended to at least include technical and functional equivalents that operate in a similar manner to accomplish a similar result. Additionally, in some instances where a particular embodiment of the invention includes a plurality of system elements or method steps, those elements or steps may be replaced with a single element or step. Likewise, a single element or step may be replaced with a plurality of elements or steps that serve the same purpose. Further, where parameters for various properties or other values are specified herein for embodiments of the invention, those parameters or values can be adjusted up or down by $1/100^{th}$, $1/50^{th}$, $1/20^{th}$, $1/10^{th}$, $1/5^{th}$, $1/3^{rd}$, $1/2$, $2/3^{rd}$, $3/4^{th}$, $4/5^{th}$, $9/10^{th}$, $19/20^{th}$, $49/50^{th}$, $99/100^{th}$, etc. (or up by a factor of 1, 2, 3, 4, 5, 6, 8, 10, 20, 50, 100, etc.), or by rounded-off approximations thereof, unless otherwise specified. Moreover, while this invention has been shown and described with references to particular embodiments thereof, those skilled in the art will understand that various substitutions and alterations in form and details may be made therein without departing from the scope of the invention. Further still, other aspects, functions, and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. The contents of references, including reference texts, journal articles, patents, patent applications, etc., cited throughout the text are hereby incorporated by reference in their entirety for all purposes; and all appropriate combinations of embodiments, features, characterizations, and methods from these references and the present disclosure may be included in embodiments of this invention. Still further, the components and steps identified in the Background section are integral to this disclosure and can be used in conjunction with or substituted for components and steps described elsewhere in the disclosure within the scope of the invention. In method claims (or where methods are elsewhere recited), where stages are recited in a particular order—with or without sequenced prefacing characters added for ease of reference—the stages are not to be interpreted as being temporally limited to the order in which they are recited unless otherwise specified or implied by the terms and phrasing.

What is claimed is:

1. A batch, pressure-driven membrane-separation system, comprising:
   a pressurizable reservoir for storing feed liquid at a first pressure;
   a conduit loop fluidly coupled with the pressurizable reservoir;
   a first pumping mechanism configured to deliver feed liquid in batch reflow from and to the reservoir and to circulate the feed liquid through the conduit loop at a consistently elevated pressure during permeate production;
   a pressurizing-liquid conduit and a second pumping mechanism positioned and configured to deliver a second pressurized liquid through the pressurizing-liquid conduit into the pressurizable reservoir at a second pressure that is higher than the first pressure of the feed liquid to increase the pressure of the feed liquid in the pressurizable reservoir;
   a separation structure including a movable wall, membrane, bladder, or diaphragm in the pressurizable reservoir and configured to separate (i) the feed liquid from (ii) the second pressurized liquid and to apply pressure from the second pressurized liquid to the feed liquid to counteract an increasing difference in osmotic pressure across the membrane; and
   a liquid-separation module including a membrane for liquid separation with a retentate side and a permeate side defined on opposite sides of the membrane, wherein the liquid-separation module is coupled with the conduits (a) to deliver the feed liquid at the elevated pressure into the retentate side of the liquid-separation module and (b) to extract retentate from the retentate side of the liquid-separation module, wherein the liquid-separation module, the pressurizable reservoir, and the conduit loop are configured to provide a substantially closed loop for recirculation of the retentate of the feed liquid through the liquid-separation module.

2. The system of claim 1, wherein the membrane is a reverse-osmosis membrane.

3. The system of claim 1, wherein the membrane is a nanofiltration membrane.

4. The system of claim 1, wherein the second pressurized liquid is permeate from the permeate side of the membrane.

5. The system of claim 1, wherein the separation structure is an expandable storage tank.

6. The system of claim 5, wherein the expandable storage tank is a bladder or a flexible storage tank.

7. The system of claim 1, further comprising a source-liquid holding tank fluidly coupled with the pressurizable reservoir and configured to add source liquid from the source-liquid holding tank as a component of the feed liquid in the pressurizable reservoir and valves for replacing liquids contained in the system of claim 1 with source liquid.

8. The system of claim 1, wherein the second pumping mechanism is a pump controlled by a variable-frequency drive.

* * * * *